United States Patent [19]

Richter et al.

[11] Patent Number: 4,698,579
[45] Date of Patent: Oct. 6, 1987

[54] CHARGER FOR A BATTERY-OPERATED SURGICAL MACHINE

[75] Inventors: Karl M. Richter, Wendtorf; Hans E. Harder, Probsteierhagen, both of Fed. Rep. of Germany

[73] Assignee: Howmedica International, Inc., Schoenkirchen, Fed. Rep. of Germany

[21] Appl. No.: 888,103

[22] Filed: Jul. 18, 1986

Related U.S. Application Data

[63] Continuation of Ser. No. 630,472, Jul. 12, 1984, abandoned.

[30] Foreign Application Priority Data

Jul. 13, 1983 [DE] Fed. Rep. of Germany ....... 3325282

[51] Int. Cl.$^4$ .............................................. H02T 7/00
[52] U.S. Cl. .......................................... 320/14; 320/2; 320/40; 320/48
[58] Field of Search ................... 320/2, 14, 39, 40, 48

[56] References Cited

U.S. PATENT DOCUMENTS 3,919,618  11/1975  Coleman et al. ...................... 320/39

OTHER PUBLICATIONS

"Thackray Cordless Bone Drill–Operating and Sterilising Instructions", Chas F. Thackray Ltd., Leeds, England.

Primary Examiner—Patrick R. Salce
Assistant Examiner—Anita M. Ault
Attorney, Agent, or Firm—Charles J. Knuth; Peter C. Richardson; Lawrence C. Akers

[57] ABSTRACT

A charger for a battery-operated surgical machine includes a charging circuit and a housing. The housing contains the charging circuit and is provided with at least one plug receptacle means for the battery component of the surgical machine. The housing is also fitted with a selector switch connected to the charging circuit. In a first position of the selector switch the charging circuit charges the battery immediately, while in a second position of the switch the charging circuit first discharges the battery down to a predetermined lower potential and then charges it up to a predetermined higher potential.

4 Claims, 2 Drawing Figures

CHARGER FOR A BATTERY-OPERATED SURGICAL MACHINE

This is a continuation of application Ser. No. 630,472 filed on Jul. 12, 1984 now abandoned.

BACKGROUND OF THE INVENTION

The present invention relates to a charger for a battery-operated surgical machine, having a housing containing the charging circuit and provided with at least one plug receptacle means for the battery component of the surgical machine. Such a charger is known (see U.S. Pat. No. 4,288,733).

The battery componet of a surgical machine, containing for example several nickel-cadmium cells, is typically readily detachable from the machine, being for example a part of the handle thereof. The battery drives an electric motor, which in turn drives a drill, cutter, grinder, etc. After a certain period of operation, the batteries require recharging. The battery component is thus removed from the machine housing and connected to the charger.

For surgical use, the battery component must function reliably. It must be assured that the battery component will not be exhausted during a surgical operation, because the operation, of course, cannot be required to be interrupted for battery recharging and then resumed. Of course, spare battery parts may be kept at hand, but even so there is a danger that they may be insufficiently charged, unless suitable precautions are taken.

Nickel-cadmium cells especially tend to be exhausted quickly if, after being charged repeatedly, they have not been discharged to below a certain level.

SUMMARY OF THE INVENTION

The object of the invention, then, is to provide a charger for a battery-operated surgical machine, such as to ensure that charged storage batteries or cells, in particular nickel-cadmium cells, will function reliably.

This object is accomplished, according to the invention, in that the housing is fitted with a selector switch connected to the charging circuit, the battery being charged immediately by the charging circuit in one switch position, while in the other position the charging circuit first discharges the battery to a preassigned lower potential and then charges it to a preassigned potential.

In the one position of the switch, the charging circuit charges the battery to a preassigned maximum potential, irrespective of the starting potential from which the charging has been effected. This mode will normally be selected only in special cases where it is important to recharge the battery part as quickly as possible. In the other case, contrariwise, the battery is first discharged to a preassigned lowermost potential, for example 25% of the rated potential, or to a potential corresponding to about 25% of the rated capacity of the battery. Then the battery is automatically charged up to a preassigned maximum, for example a potential equivalent to 75% of the rated capacity. This ensures that no condition of premature exhaustion can arise as a result of repeated charging and insufficient discharging of the battery.

According to a further modification of the invention, provision is made for a third position of the selector switch, in which the charging circuit first discharges the battery to a preassigned lower potential, then charges it to the preassigned upper level, then discharges it again to the preassigned lower potential, and finally recharges it to the preassigned upper potential, compares the actual potential with the requistie potential at preassigned time intervals during the second discharging and recharging of the circuit, and signals an indication if the quantity compared attains a preassigned magnitude.

In this way, the charging operation is associated with a test phase at the same time. Without a first discharging and recharging, a comparison between actual and required values during the several stages of the discharge and recharge curve would not be very informative. For this reason, there is first a discharging and a recharging before the test program itself, paralleling the charging program proper, is executed. Thus the first discharging and recharging prepares the battery and brings it to a preassigned charge condition, for example 75% of capacity. Then, at intervals of time, the charge potential is compared to preassigned standard. If the values compared are too great, a defect is indicated, usually due to the internal state of the battery.

To provide an overview of the several operating conditions of the charger according to the invention, a further refinement of the invention proposes that the graph of the discharge-charge curve be represented on the housing, with a series of light-emitting diodes beneath the graphs, each representing a particular segment of the curve. The blinking of the diodes may for example indicate at what stage of charging or discharging the charger is at a given moment.

All rechargeable batteries have the property of discharging even if not under load. Therefore a further refinement of the invention provides that after completion of charging, the charging circuit generates a residual current equal to the spontaneous discharging current of the battery.

DETAILED DESCRIPTION OF THE INVENTION

An embodiment of the invention will now be illustrated in more detail with reference to the drawings by way of example.

Figure 1:
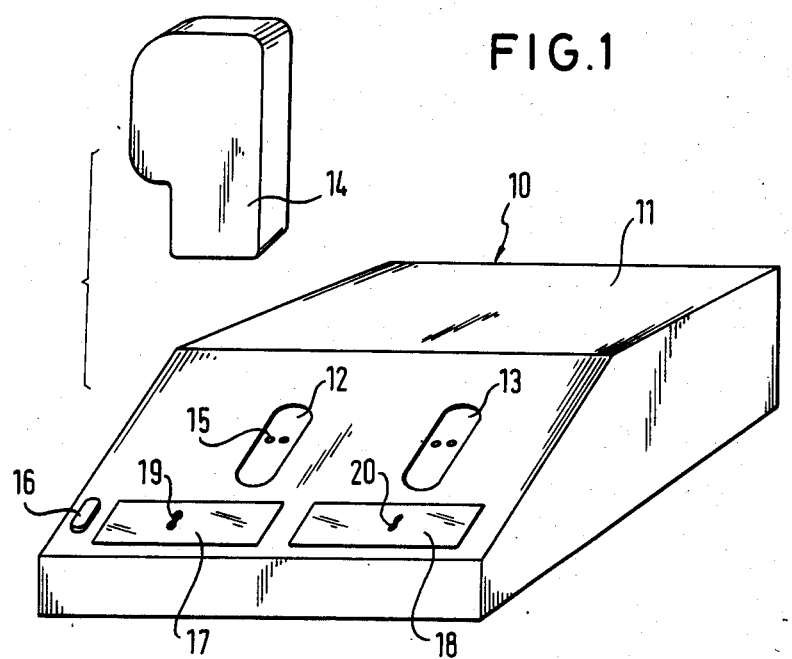
FIG. 1 shows a charger according to the invention in schematic perspective.

Before entering further upon the details represented in the drawings, be it prefaced that each of the features shown and described, in itself or in combination with features of the claim, is of essential significance to the invention.

FIG. 1 shows a charger 10 having a housing 11 with two depressions 12, 13 in an inclined surface to accept a battery part 14 of a surgical machine not actually represented. The battery part 14 may for example be inserted in the depressions 12, 13 by means of a swallowtail connection. It has plugs, not shown, capable of being inserted in receptacles 15.

Figure 2:
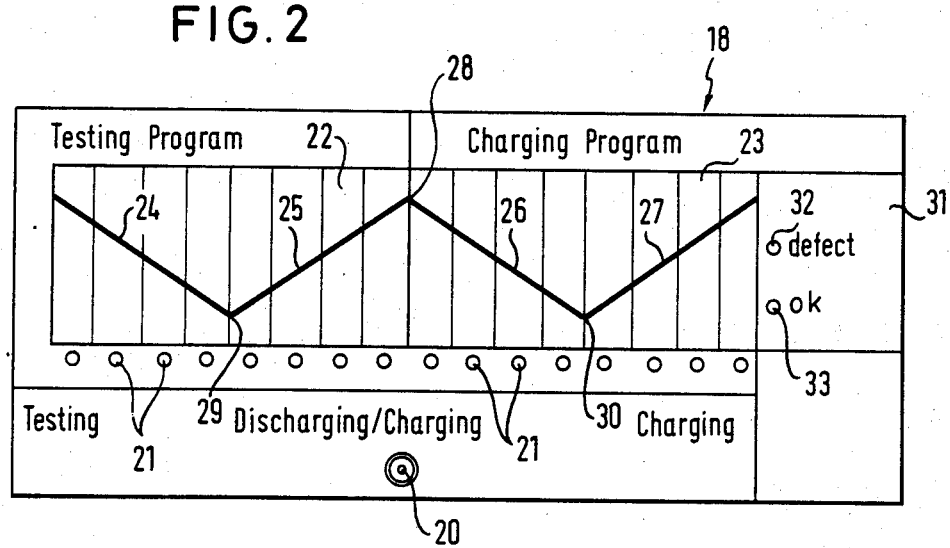
FIG. 2 shows a program schedule of the charger in FIG. 1.

On the housing, an on-switch 16 is provided as well, to start the charger 10 to be connected to the power supply. Lastly, two program panels 17, 18 are provided, each having a toggle switch 19, 20. FIG. 2 shows the program panel 18 in more detail.

In the panel 18, sixteen light-emitting diodes 21 are arranged. The first eight diodes pertain to a first area 22 and the second eight to an area 23. In the area 22, a curve is shown, having a straight descending branch 24 and an asscending branch 25. Similarly, a descending branch 26 and an ascending branch 27 are represented in area 23. Branches 25, 26 terminate in a common maximum 28, located at the upper ends of branches 24, 27. Branches 24 and 25 have a common minimum 29, and branches 26, 27 a common minimum 30. The minima 29, 30 lie at the same height and correspond to a minimal state of discharge, for example of a nickel-cadmium cell, for example 25% of rated capacity. The maximum 28 corresponds to a maximum state of charging of the nickel-cadmium cell, for example 75% of rated capacity.

Next to the right-hand area 23, an additional area 31 is arranged, with a light-emitting diode 32 and a light-emitting diode 33.

In the following, the charging operation of battery part 14 when inserted in the recess 13 will be described for the three different positions of the toggle switch 20.

1. Switch 20 in Right-Hand Position

The battery part 14 is charged independently of the degree to which it has been discharged. The charging circuit, not shown, begins charging immediately, a sensor circuit associated with the charging circuit ascertaining the actual and required potential of the battery part 14 and indicating by means of the associated diode 21 in what state of charge the battery part then is. When the maximum is reached, the charging circuit goes out of charging mode and reduces the charging current, for example 2 amperes, to one-hundredth of that amount, in order to keep the battery part in maximal charged condition until use.

2. Switch 20 in Center Position

In this mode, the "program" likewise begins in the right-hand area 23, but the nickel-cadmium cells are first discharged to the minimum 30. The discharging may begin anywhere between the maxium 28 and the minimum 30, depending on the state of discharge of the cells. The discharge likewise takes place at 2 amperes for example. When the minimum is reached, the charging circuit automatically switches to charging and charges the battery part until the maximum is reached.

In this mode of operation of the charger, it cannot be ascertained whether the cells are still functioning properly. To be sure, even in this mode, a malfunction of the charger can be detected, in particular by measuring the times of discharging and charging. If for example charging takes longer than 60 minutes, or if discharging takes longer than 45 minutes, the diode 32 will blink in order to indicate a defect in the charger.

3. Switch 20 in Left-Hand Position

In this mode of operation of the charger, the charging process is linked to a test program. First the cell is discharged, the discharge beginning as above described somewhere between the maximum and the minimum of branch 24. When the minimum 29 is reached, the charging circuit automatically starts charging the battery up to the maximum 28. The first eight diodes 21 indicate each stage reached in this process. When the maximum 28 is reached, a redischarging of the battery part 14 down to the minimum 30 begins. During this discharge, at four intervals of time in the present case, a comparison is made between the actual charge potential and a standard. If the values to be compared differ substantially from each other, this is indicated by the diode 32, red for example. When the minimum 30 is reached, a recharging takes place along branch 27, an actual-standard comparison of potentials being again made at four intervals of time. In this case also, the diode indicates when the comparison has attained a preassigned magnitude. If the test has been passed satisfactorily, this ensures that the cell will function normally for its capacity. After completion of the test, and of the charging process at the same time, the positive completion of the charging operation may be indicated by the diode emitting green light for example.

We claim:

1. A charger for a battery-operated surgical machine comprising a charging circuit and a housing containing the charging circuit, with said housing being provided with at least one plug receptacle means for connection with the battery component of the surgical machine and said housing also being fitted with means connected to said charging circuit for activating said charging circuit, wherein when the charging circuit is activated by said activating means the charging circuit first discharges said battery component down to a predetermined lower potential, then charges it up to a predetermined higher potential, then discharges it again to said predetermined lower potential and finally charges in again to said predetermined higher potential, with said charging circuit containing means for comparing the actual potential of the battery component with a standard potential at predetermined time intervals during both the discharging and charging phases of the second cycle of discharging and charging, and means for indicating when the difference between said actual and standard potentials attains a predetermined magnitude.

2. A charger of claim 1 comprising additionally means for representing a graph of the disharging and charging curves on the housing, and a row of light-emitting diodes arranged on the housing beneath said curves, with each of said diodes corresponding to a particular segment of one of said curves and connected to said charging circuit in such a manner that it lights up to indicate when the battery component is in the corresponding stage of discharging or charging.

3. A charger of claim 1 wherein, after completion of the second charging step, the charging circuit generates a residual current equal to the spontaneous discharge current of said battery component.

4. A charger of claim 1 wherein said predetermined higher potential is substantially below the full rated capacity of said battery component.

* * * * *